(12) United States Patent
Zheng et al.

(10) Patent No.: US 8,437,474 B2
(45) Date of Patent: *May 7, 2013

(54) PUBLIC KEY ENCRYPTION FOR GROUPS

(75) Inventors: Yuliang Zheng, Charlotte, NC (US); Luis Antonio Suarez, Concord, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/947,521

(22) Filed: Nov. 16, 2010

(65) Prior Publication Data

US 2011/0058673 A1 Mar. 10, 2011

Related U.S. Application Data

(63) Continuation of application No. 11/022,491, filed on Dec. 22, 2004, now Pat. No. 7,860,243.

(60) Provisional application No. 60/531,695, filed on Dec. 23, 2003, provisional application No. 60/531,263, filed on Dec. 22, 2003.

(51) Int. Cl.
*H04K 1/00* (2006.01)
*H04L 29/06* (2006.01)
*H04L 9/32* (2006.01)
*G06F 11/30* (2006.01)
*G06F 12/14* (2006.01)

(52) U.S. Cl.
USPC ........... 380/255; 713/156; 713/178; 713/180; 713/193

(58) Field of Classification Search .................. None
See application file for complete search history.

(56) References Cited

U.S. PATENT DOCUMENTS

| | | | |
|---|---|---|---|
| 5,604,801 A | 2/1997 | Dolan et al. | |
| 6,035,402 A | 3/2000 | Vaeth et al. | |
| 6,393,563 B1 | 5/2002 | Maruyama et al. | |
| 6,530,020 B1 | 3/2003 | Aoki | |
| 6,636,968 B1 * | 10/2003 | Rosner et al. | 713/178 |
| 6,748,528 B1 | 6/2004 | Greenfield | |
| 6,802,002 B1 | 10/2004 | Corella | |
| 6,834,112 B1 | 12/2004 | Brickell | |
| 6,880,081 B1 | 4/2005 | Itkis | |
| 6,904,524 B1 | 6/2005 | Jaeger, Jr. et al. | |

(Continued)

FOREIGN PATENT DOCUMENTS

| | | |
|---|---|---|
| WO | 2005062919 A3 | 7/2005 |
| WO | 2007002691 A3 | 1/2007 |

*Primary Examiner* — Shin-Hon Chen
(74) *Attorney, Agent, or Firm* — K&L Gates LLP

(57) ABSTRACT

A system is comprised of a user and a group, wherein the group is comprised of a group leader and a group of M members where M is equal to or greater than one. The group leader generates a group public key and a group leader "master" private key. The group leader creates a personalized watermarked or decryption key, also referred to as an individual private key, for each group member. The individual private key uniquely identifies each group member. The group leader distributes the individual private keys to each of the group members. Each group member receives from a user a message encrypted using the group public key. Each of the group members uses its individual private key to decrypt the encrypted message sent by the user to the group.

7 Claims, 5 Drawing Sheets

U.S. PATENT DOCUMENTS

| | | |
|---|---|---|
| 6,915,434 B1 * | 7/2005 | Kuroda et al. ............... 713/193 |
| 7,093,133 B2 | 8/2006 | Hopkins et al. |
| 2001/0034836 A1 | 10/2001 | Matsumoto et al. |
| 2002/0026575 A1 | 2/2002 | Wheeler et al. |
| 2002/0078355 A1 | 6/2002 | Samar |
| 2002/0120840 A1 | 8/2002 | Yellepeddy et al. |
| 2002/0144109 A1 | 10/2002 | Benantar et al. |
| 2002/0154782 A1 | 10/2002 | Chow et al. |
| 2003/0023847 A1 | 1/2003 | Ishibashi et al. |
| 2003/0081789 A1 | 5/2003 | Numao et al. |
| 2003/0120931 A1 * | 6/2003 | Hopkins et al. ............... 713/180 |
| 2003/0154376 A1 | 8/2003 | Hwangbo |
| 2003/0163700 A1 | 8/2003 | Paatero |
| 2003/0237004 A1 | 12/2003 | Okamura |
| 2004/0039925 A1 | 2/2004 | McMillan et al. |
| 2004/0054913 A1 | 3/2004 | West |
| 2004/0068650 A1 | 4/2004 | Restnitzky et al. |
| 2004/0264697 A1 | 12/2004 | Gavrilescu et al. |
| 2005/0097316 A1 | 5/2005 | Kim |
| 2005/0114862 A1 | 5/2005 | Bisdikian et al. |
| 2005/0138374 A1 | 6/2005 | Zheng et al. |
| 2006/0155985 A1 * | 7/2006 | Canard et al. ............... 713/156 |
| 2006/0291664 A1 | 12/2006 | Suarez et al. |
| 2008/0016357 A1 | 1/2008 | Suarez |

* cited by examiner

PUBLIC KEY ENCRYPTION FOR GROUPS

CROSS-REFERENCE TO RELATED APPLICATIONS

This application is a continuation application entitled to the benefit of, and claims priority to, U.S. patent application Ser. No. 11/022,491, filed Dec. 22, 2004, and is also entitled to the benefit of, and claims priority to provisional U.S. Patent Application Ser. No. 60/531,263 filed on Dec. 22, 2003, and U.S. Patent Application Ser. No. 60/531,695, filed on Dec. 23, 2003, the entireties of which are incorporated by reference herein.

FIELD OF THE INVENTION

The present invention relates to a system and a method for securely distributing and identifying computer-generated cryptographic keys.

BACKGROUND OF THE INVENTION

Businesses and individuals are increasingly dependent on computers and computer-based electronic communication. More and more businesses are moving toward "paperless" modes of operation, and the convenience of the Internet has resulted in individuals using electronic media for various activities, such as communicating via email, banking, paying bills, investing money and shopping, to name but a few. While businesses and individuals desire the convenience of electronic communication, these entities also want to maintain at least the same level of security that more traditional methods of communication offer. However, more traditional methods of communication are inherently more secure than electronic communication because of the relative ease with which computers may be used to intercept the information being communicated between two or more computers. Accordingly, cryptography techniques have been created to secure information being communicated electronically.

Cryptography is the study of sending messages in a secret form so that only those authorized to receive the message be are able to read it. Cryptography may be used for any form of communication, but for the purposes of this application, electronic cryptography will be discussed. For electronic communication, a message is transformed into a secret form using a cryptographic key and then may be transformed back into its original or clear form with a cryptographic key. Examples of cryptographic techniques include symmetric encryption, asymmetric encryption and hashing.

Symmetric encryption involves using a single shared key among all users communicating with one another. A message is locked (encrypted) with a key and then the same key is used to unlock (decrypt) the message. In order to protect a message when using symmetric encryption, it is vital to have a secure method to exchange the secret key to all users.

Asymmetric encryption involves using a key pair to secure information. A key pair is comprised of a private key (decryption key), which is known only to a single user or a limited group of users, and a public key (encryption key), which may be known by anyone. In order to encrypt and decrypt a message, both the private key and public key of the key pair must be used. For example, a message will be encrypted by a sender using the public key of the intended recipient of the message. Once the recipient receives the encrypted message, his or her private key is used to decrypt the message.

Hashing involves transforming an input message of any size into an output or hash value of another, generally smaller, size using a mathematical algorithm. The hash value is known as the message digest. The message digest is a "digital fingerprint" of the input message and serves to maintain integrity of the hashed message by allowing a recipient to verify that the message has not been tampered with since being hashed. Ultimately, in order to maintain security of the encrypted and/or hashed message or information, the key or hash function must be protected.

A system using more than one cryptographic technique provides a greater level of security for the information being stored and communicated by the system. However, a system with multiple users and applications such as a network computer system, using multiple cryptographic techniques to protect multiple messages and pieces of information, results in a large volume of keys being generated and utilized. However, a user such as a person, computer, or software application may want to send information and/or other data to a select group in a system with multiple members without having to send it to each member individually. For example, a user may want to send a message to one recipient which distributes the message to all the members of a group as opposed to sending a message to each recipient, especially if there are potentially hundreds or thousands of recipients. It may be desirable for any one of the recipients to be able to open the email, for example, and receive the information independently of the other recipients. It may be desirable to know exactly which recipient opened the message for purposes of maintaining the security and integrity of the system. However, in order to achieve this recipient identification with currently available systems, the information, data and/or message would need to be encrypted with a public key for each group member. Each group member would use its private key to decrypt the information and/or data. Although it is more secure to use individual public and private key pairs, it becomes increasingly more time consuming when there are, for example, hundreds or thousands of members in a group. It is less efficient and slower to generate more key pairs. Therefore, there is a need to increase efficiency yet maintain the security associated therewith. There is also a desire to have the capability to know which member of the group has received, opened or decrypted the information using its private key.

SUMMARY OF THE INVENTION

The present invention relates to a system and method for public key encryption for groups. The system comprises a user and a group wherein the group is comprised of a group leader and a group of M members where M is equal to or greater than one.

According to the method of the present invention, the group leader generates a group public key and a group leader "master" private key. The group leader creates a personalized or watermarked decryption key, also referred to as an individual private key, for each group member. The individual private key uniquely identifies each group member. The group leader distributes the individual private keys to each of the group members. Each group member receives from a user a message encrypted using the group public key. Each of the group members uses its individual private key to decrypt the encrypted message sent by the user to the group.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENTS

The following description of the preferred embodiment(s) is merely exemplary in nature and is in no way intended to limit the invention, its application, or uses. The present application has broad potential applications and utility, which is contemplated to be adaptable to a wide range of entities for distributing and identifying cryptographic keys within a system, preferably a computer network system. For example, it is contemplated that the present invention would be beneficial for use by any bank that provides online banking services, such as statement review, bill paying and/or investing, to its customers. Additionally, it is contemplated that the system and method of the present invention would be equally beneficial to be used by any retail business that provides online retail services. Further, the system and method of the present invention would be beneficial to any business using computers to store, access, process or use information, particularly if that business uses an intranet for communication between multiple locations. The following description is provided herein solely by way of example for purposes of providing an enabling disclosure of the invention, but does not limit the scope or substance of the invention.

Figure 1:
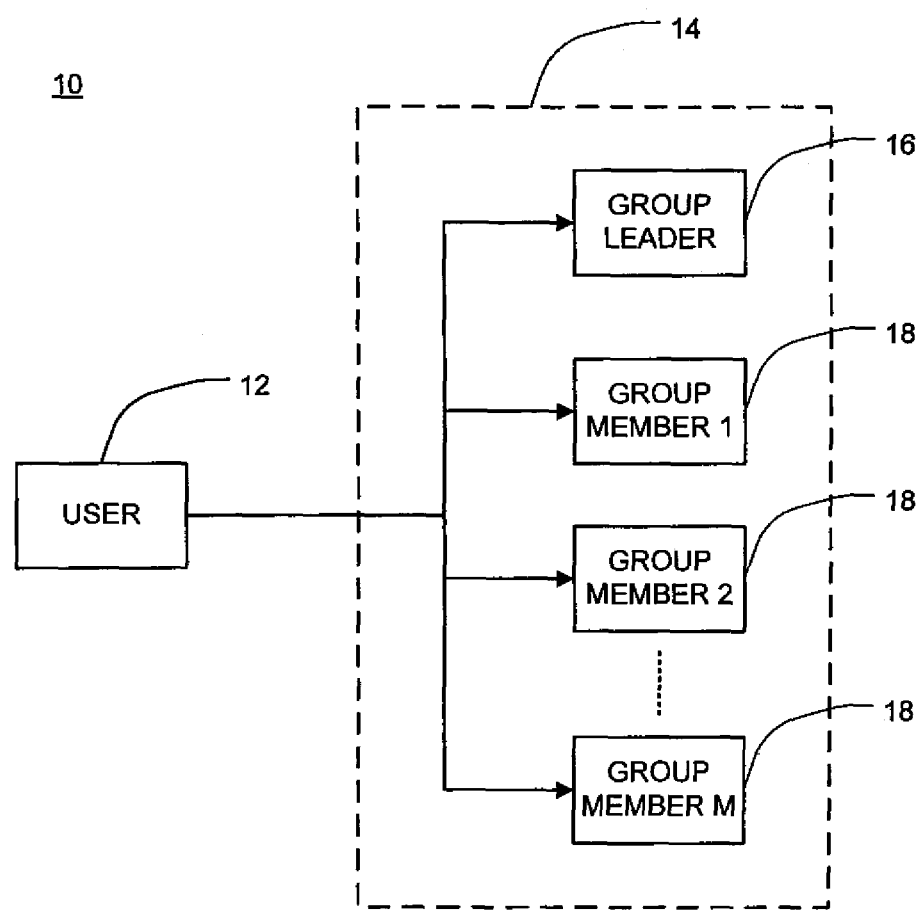
FIG. 1 is a block diagram of a system for public key encryption for groups in accordance with the present invention.

FIG. 1 is a block diagram of a system 10 for public key encryption for groups in accordance with the present invention. Preferably, the system 10 is a computer network system. As shown in FIG. 1, the system 10 of the present invention comprises a user 12 and a group 14. The group 14 is comprised of a group leader 16 and a group of M members 18, where M is greater than or equal to one. It is presumed that the group leader 16 is to be trusted by all group members 18 and that the public key encryption system is secure. A group member 18 includes, but is not limited to, a person, a computer, or a software application. The group illustrated in FIG. 1 has M members with M equal to or greater than one. There is no limit to the number of users and group members in the system.

Figure 2:
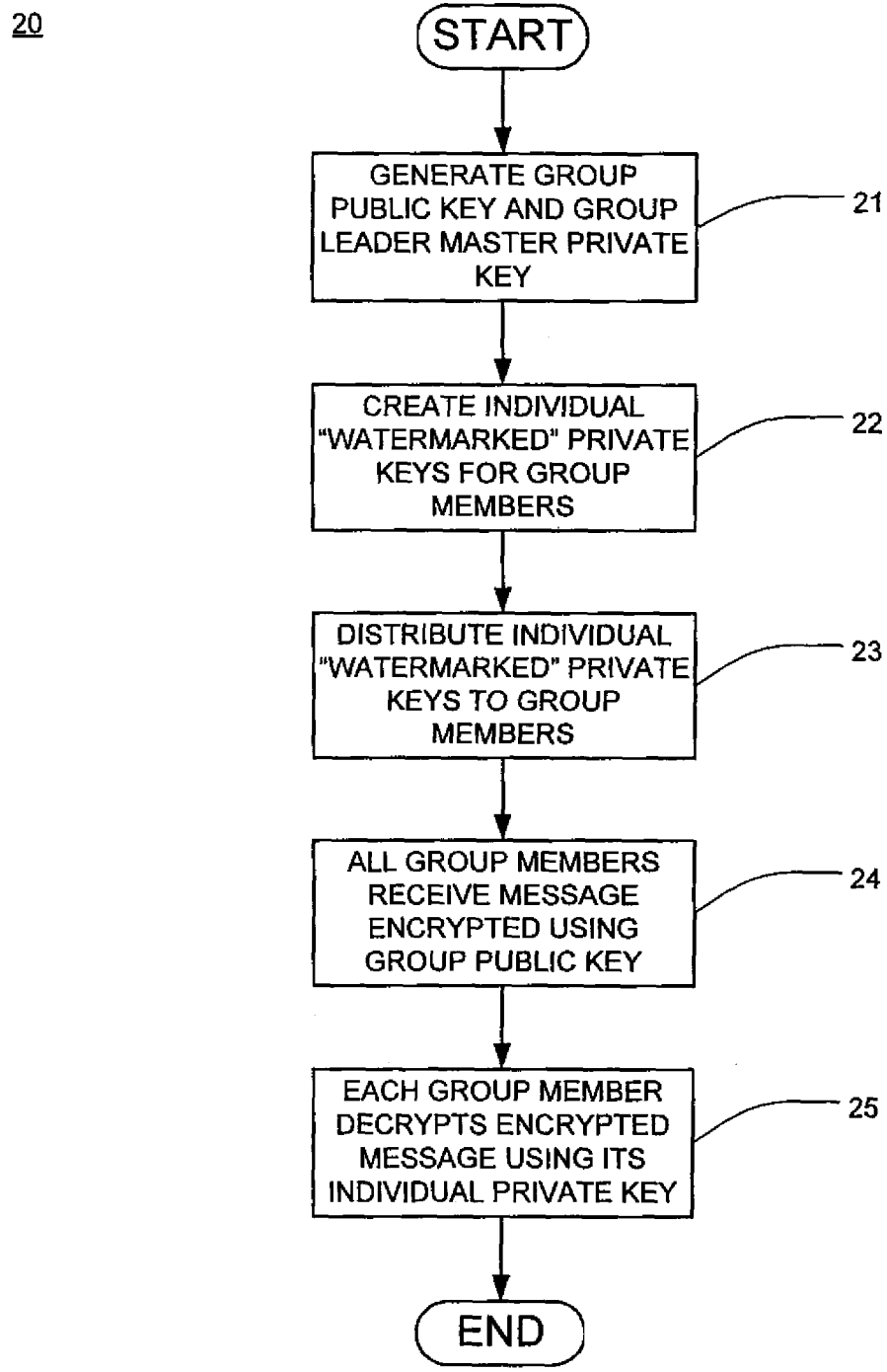
FIG. 2 is a flowchart illustrating the method of public key encryption for groups in accordance with the present invention.

FIG. 2 is a flowchart illustrating the method of public key encryption for groups in accordance with the present invention. The group leader 16 generates a group public key and a group leader "master" private key as shown in step 21. The group leader 16 creates a personalized watermarked or decryption key 30, also referred to as an individual private key, for each group member 18 as shown in step 22. The individual private key 30 uniquely identifies each group member 18. The group leader 16 distributes the individual private keys 30 to each of the group members 18 as shown in step 23. Once the private keys 30 have been distributed, communication with the group 14 may be accomplished by encrypting a message using the group public key. All group members 18 then receive the message as shown in step 24. Finally, each of the group members 18 uses its individual private key to decrypt the encrypted message sent by the user 12 to the group 14 as shown in step 25.

Figure 3:
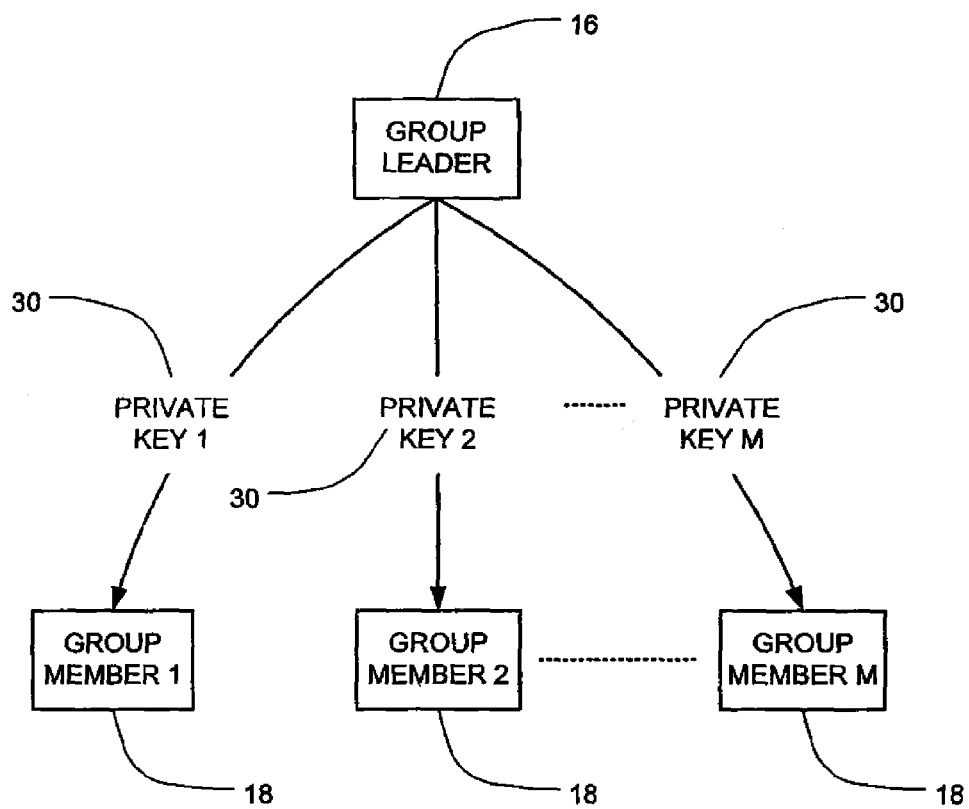
FIG. 3 is a block diagram of a method of distributing keys by the group leader in accordance with the present invention.

FIG. 3 is a block diagram of illustrating a method of distributing a public-private key pair by the group leader 16 to the group members 18 in accordance with step 23 of FIG. 2. The group leader 16 generates a public key for the group 14 and the individual private key 30 for each of the group members 18. The group public key and the respective private keys 30 thus define a unique public-private key pair for each group member 18. The group leader 16 distributes each private key to the respective group member 18 for which it was generated. Each group member 18 is then able to decrypt with its own private key 30, independently of the other group members 18, any message encrypted with the single group public key. However, because each private key 30 is personalized, the system 10 discourages unauthorized disclosure of any group member's private key 30 to unauthorized third parties.

The public-private key pair can be generated in accordance with a standard or proprietary asymmetric encryption method. Examples of such asymmetric encryption methods suitable for use with the present invention include, but are not limited to, RSA, Rabin, variants of RSA, and variants of Rabin. However, the following discussion assumes that the public and private keys used are established in accordance with RSA encryption.

When the group leader 16 generates a public-private key pair for use in the RSA encryption method, the group leader 16 selects two large prime numbers, represented by (p, q) in equations (1) and (2), according to known RSA principles. Preferably, the minimum size of each of p and q is at least 512 bits. N, which represents the first part of the RSA public key for the group, may be computed as follows:

$$N = p \times q \qquad (1)$$

$$\phi(N) = (p-1) \times (q-1) \qquad (2)$$

The group leader 16 also generates a pair of public and private exponents (e, d), where e is the second part of the public key for the group 14 and d is a master private key that is used to manufacture the private keys 30 for all of the group members 18. The exponents e and d are selected such that the product of e and d satisfies equation (3):

$$e \times d = 1 \bmod \phi(N) \qquad (3)$$

The private exponent d becomes the group leader's private key. In addition, as stated previously, the group leader 16 utilizes the private exponent d to create a personalized decryption key 30, also referred to as an individual private key, for each of the group members. The decryption keys $d_i$ are computed according to the following equation (4):

$$d_i = d + \mathrm{HASH}_{32}(d, N, e, \mathrm{ID}_i, Z) \times \phi(N) \qquad (4)$$

where + and × are ordinary integer addition and multiplication operations, $\mathrm{ID}_i$ is a personal identifier for the specific group member i, such as name or email address; $\mathrm{HASH}_{32}$ represents a one-way hash function in which the first 32 bits of the output are utilized; and Z represents a data string that is shared among all group members. The personal identifier $\mathrm{ID}_i$ may be any unique value, but is preferably a meaningful data string such as a user's name or email address. The hash algorithm may be any standard or proprietary hash algorithm. An example of a suitable hash algorithm includes, but is not limited to, SHA-1. In the present embodiment, the hash algorithm preferably provides an output of at least 32 bits. However, it is within the scope of the present invention that larger numbers of output bits (such as 64 or the like) may likewise be used for even greater security, but that a hash function that produces at least that many bits will then be required. Z may be any additional control data, but unlike the $ID_i$ is not usually personalized to the individual user. An example of control data that might be used for Z is a timestamp.

A first group member (Group Member 1) would thus have a private key computed as shown in equation (5):

$$d_1 = d + \text{HASH}_{32}(d, N, e, ID_1, Z) \times \phi(N) \quad (5)$$

where $ID_1$ is the personal identifier for Group Member 1 such as name or email address.

The ID is the factor or component that makes each decryption key unique. However, this value is included in the hash function so that this identifying information is preferably not explicitly in the key.

It will be noted that the hash function in equation (4) utilizes both parts of the public key (N, e) for the group. It may be appreciated that the individual private keys may alternatively be computed instead by hashing the public key certificate $Cert_N$, which incorporates both N and e therein, according to equation (6):

$$d_i = d + \text{HASH}_{32}(d, Cert_N, ID_i, Z) \times \phi(N) \quad (6)$$

Once the individual private keys $d_i$ have been computed according to one of the foregoing approaches, the group leader 16 then distributes the individual private keys $d_i$ to the i-th member in the group in a secure manner. The group leader retains the master decryption key d. There are any number of ways to distribute keys as is known to one of ordinary skill in the art. If the system and method of the present invention are to be utilized for "external" communications between one certifying entity and another, then a preferred way is for the group leader 16 to distribute private keys $d_i$ along with a group public key certificate $Cert_N$, which as noted previously incorporates both parts (N, e) of the public key for the group. The public key certificate $Cert_N$ identifies the purpose of the private key.

In operation, a user 12 uses the asymmetric encryption algorithm for which the keys were established to encrypt a message for the group 14, using the group's public key (N, e), and sends it to the group 14.

In the instance that RSA encryption is used, the message is encrypted by the user in accordance with equation (7).

$$C = T^e \mod N \quad (7)$$

wherein
 C is the encrypted message,
 T is the unencrypted message, and
 e and N are defined as above.

Likewise, the group leader and each of the group members 18 may decrypt the encrypted message using RSA decryption, independently of the other group members, using their personalized decryption keys or individual private keys in accordance with equations (8) and (9), respectively.

$$T = C^d \mod N \quad (8)$$

$$T = C^{d_i} \mod N \quad (9)$$

wherein
 T is the unencrypted message,
 C is the encrypted message, and
 d, $d_i$ and N are as defined above.

A group member 18 can correctly recover the message because of equation (10) set forth below.

$$C^{d_i} \mod N = C^d \times C^{\text{HASH}_{32}(N,e,ID_i,Z) \times \phi(N)} \mod N = T \quad (10)$$

wherein
 $C^{\text{HASH}_{32}(N,e,ID_i,Z) \times \phi(N)} = 1 \mod N$.

Other asymmetric decryption methods such as RSA, Rabin, variants of RSA, and variants of Rabin can be used. Preferably, an asymmetric encryption method such as RSA decryption is used.

In the event of a key being disclosed to a third party, the group leader 16 may use p and q to identify the group member 18 who disclosed the decryption key so the group leader 16 knows which group member opened it. This can be accomplished by searching the list of member-decryption key pairs or recomputing the decryption key according to equation (6) to see which $ID_i$ will result in a $d_i$ that matches the disclosed private key. Thus, an advantage of the system and method of the present invention is that by sending a personalized decryption or individual private key, it is possible to identify the group member 18 who is the discloser.

An application in which the system and method of the present invention may be employed is for compact and secure authentication tokens in a computer network system.

Figure 4:
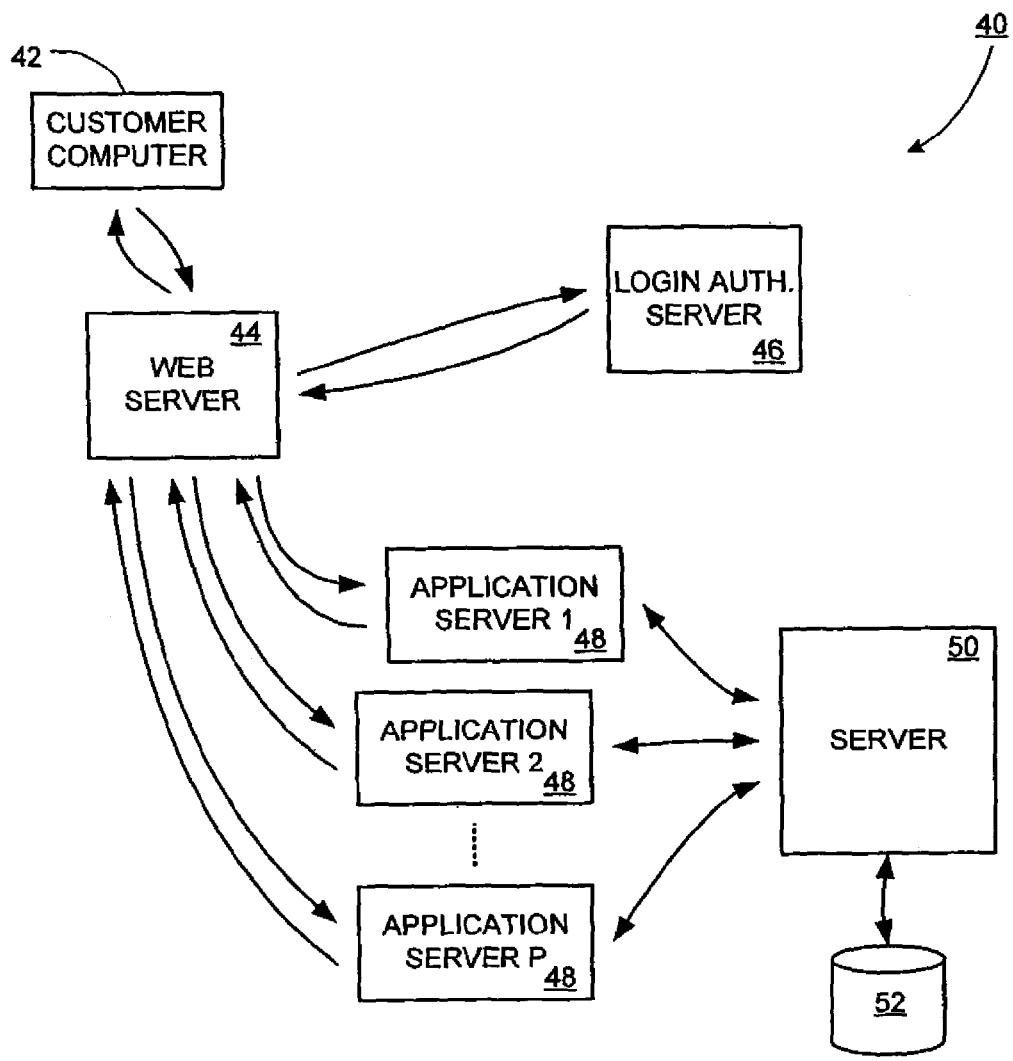
FIG. 4 is a block diagram of a computer network system suitable for use with the present invention.

FIG. 4 is a block diagram of a computer network system 40 suitable for use with the present invention. The computer network system 40 is comprised of a user 42, a webserver 44, a login authentication server 46, an application server 48, a server 50, and database 52. The user 42 logs into the computer network system 40 and enters its userid and password. This information is transmitted by the webserver 44 to the login authentication server 46 which authenticates the information and creates a token which is transmitted to the webserver 44. The webserver 44 transmits the token to the application server 48. The token should be verifiable by the application server 48 of its origin. The application server 48 communicates with the mainframe 50 to provide the user with the requested service.

Figure 5:
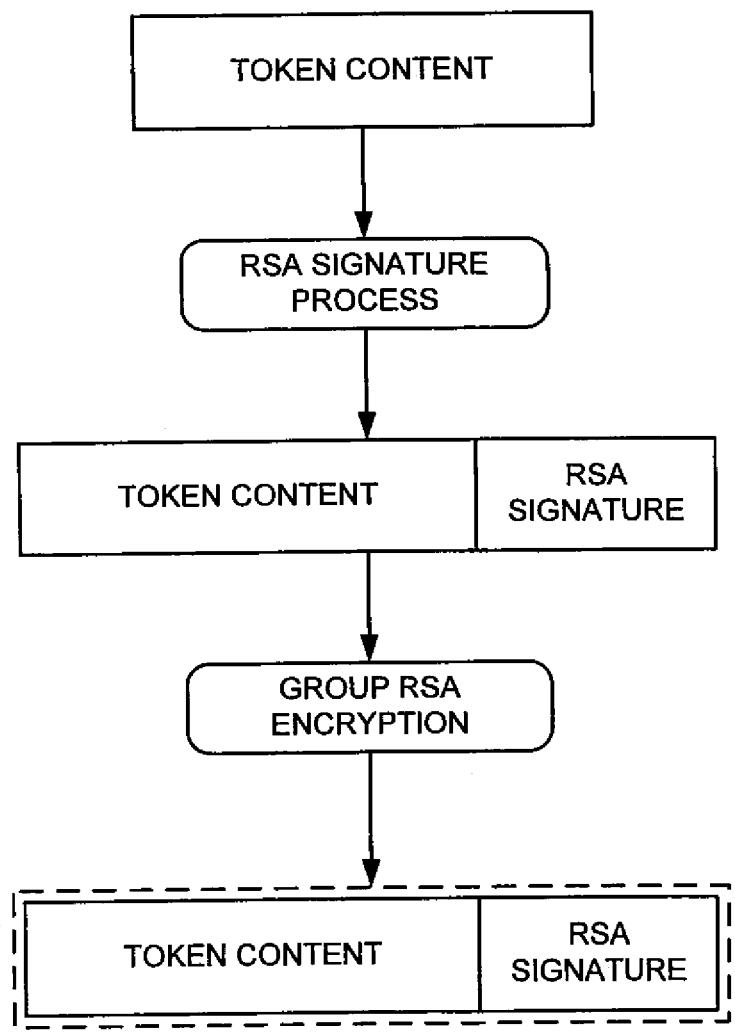
FIG. 5 is a flow diagram illustrating a compact and secure authentication token employing public key encryption for groups in accordance with the present invention.

The token that is created by the login authentication server 46 is referred to as an authentication token. It is typically issued as a cookie. The token has no size limitation. However, it is preferable for the token to be as compact as possible. One of ordinary skill in the art will recognize that the degree of compaction depends upon the encryption method employed. Additionally, the token may be encrypted to ensure the confidentiality of its contents. The token may also be wrapped with additional information and/or data. The token is signed and encrypted with a token encryption key as illustrated in FIG. 5. While the login authentication server 46 needs to sign the token only once, it may encrypt the token more than once. The exact number of encryption operations is determined by the specific encryption technique used. Thus, it is preferred to use the system and method of public key encryption for groups of the present invention. If there is more than one application server 46, all application servers share the same public key. With this approach, a token is signed and then encrypted only once regardless of the number of application servers. If an attacker were to successfully break into an application server 46 and steal the token key, the confidentiality of the tokens would be compromised and in such situation, it would be desirable to be able to identify with ease which token key has been compromised. This is an advantage offered with the system and method of the present invention. With this system and method, there will be only one public encryption key for all servers. However, each application server 48 will have a personalized decryption key or individual private token key from which one cannot determine the decryption key of another application server. These private keys, although different, perform the same function, namely to correctly decrypt a message using the same public key. Since the decryption keys are personalized, it makes it possible to identify a compromised application server from the information contained in the compromised decryption key.

The system of public key encryption for groups of the present invention when used for authentication tokens preferably employs an asymmetric encryption method. More preferably, RSA encryption is used. If RSA encryption is used to generate an authentication token, a token is first signed using the standard RSA signature scheme. The signed token is expanded due to the attached RSA signature. The signed token is then encrypted using the method of public key encryption for groups of the present invention. To validate the authentication token, the encrypted signed token is decrypted by a group member using its individual private key, and the decrypted token is verified to confirm the authenticity of the token by using the RSA signature process.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A system for public key encryption for groups, the system comprising:
a user, and
a group comprised of a group leader and at least one group member,
wherein the group has a single public key for the group and an individual private key for each group member, the individual private key having been created for each group member according to formula (5):

$$d_i = d + \text{HASH}_{32}(d, N, e, \text{ID}_i, Z)\phi(N) \qquad (5)$$

wherein
$d_i$ is the individual private key for group member i where i equals 1 to M,
M is the number of members in the group,
d is a private exponent,
e is a public exponent,
p is a prime number,
q is a prime number,
$\text{ID}_i$ is the identification for group member i,
Z is a data string that is shared among all group members,
N=p*q, and
$\phi(N)$ is=(p−1)(q−1)
and
a message received by the group from the user encrypted by asymmetric encryption using the group public key.

2. The system according to claim 1, wherein the system is a computer network system.

3. The system according to claim 2, wherein the computer network system is for banking, investing, or retail services.

4. The system according to claim 1, wherein the single public key and individual private keys are generated by the group leader.

5. The system according to claim 4, wherein the single public key and individual private keys are generated using asymmetric encryption.

6. The system according to claim 5, wherein the asymmetric encryption is selected from the group consisting of RSA, Rabin, variants of RSA, and variants of Rabin.

7. The system according to claim 6, wherein the asymmetric encryption is RSA.

* * * * *